United States Patent Office 3,341,224
Patented Sept. 12, 1967

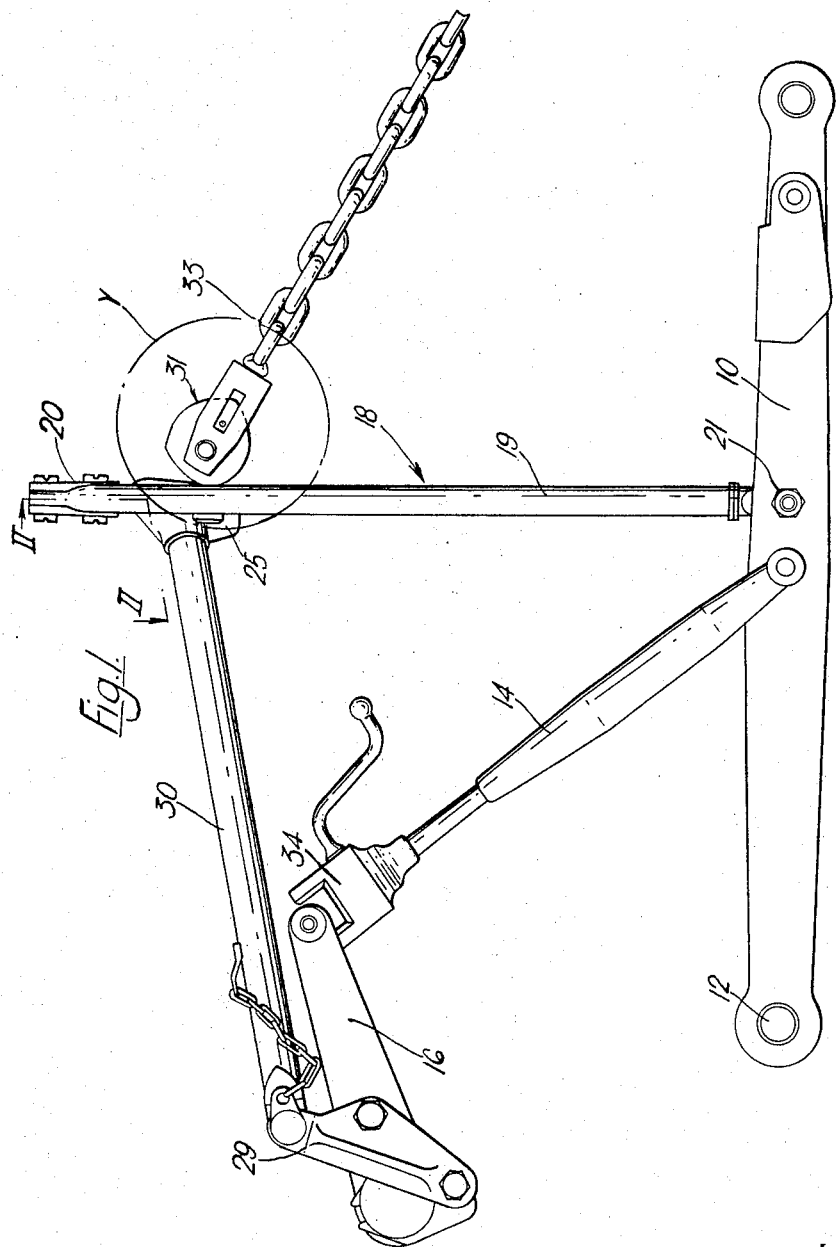

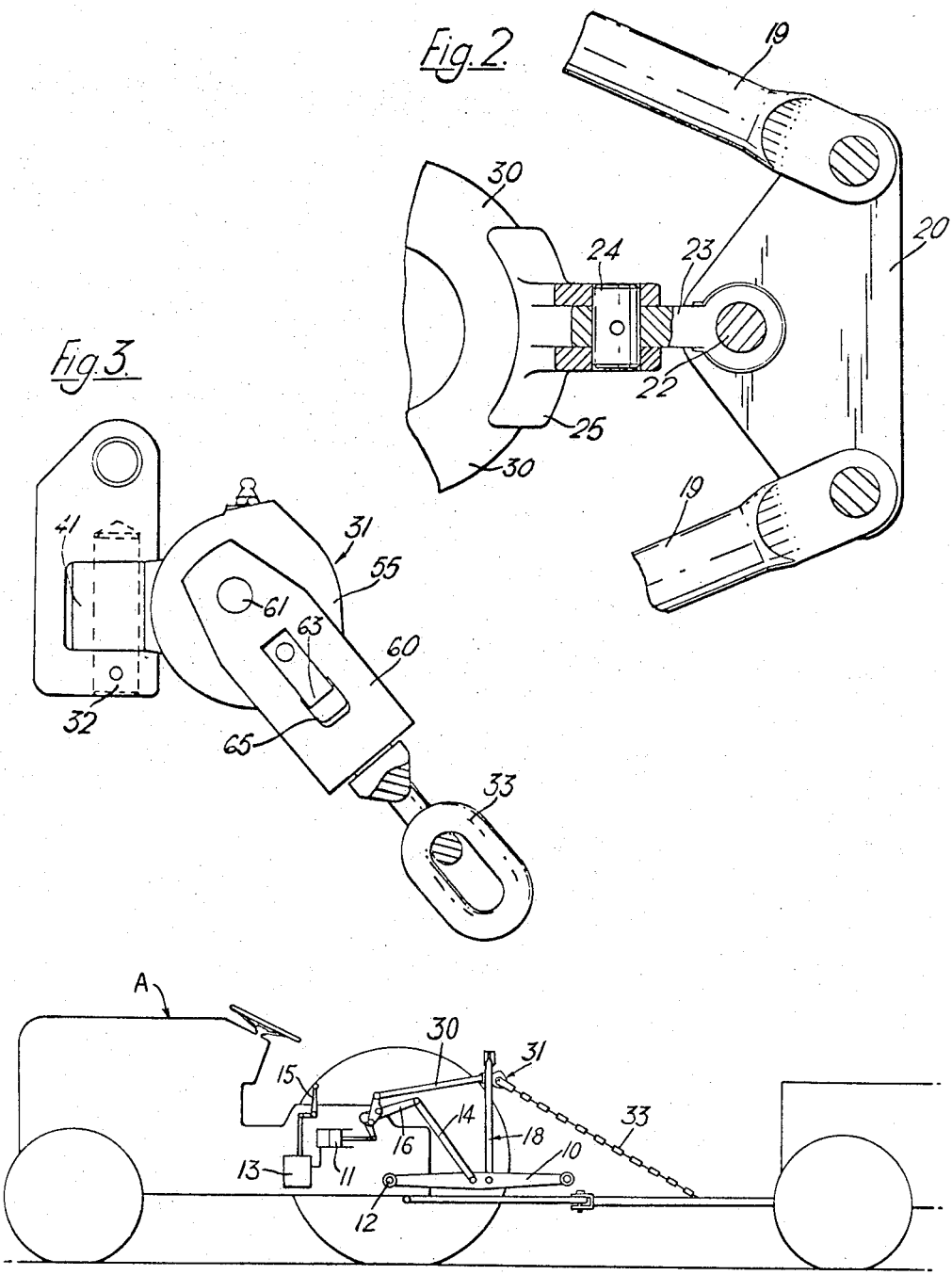

3,341,224
WEIGHT TRANSFER TRACTOR HITCH
Jean Bultheel, Taverny, and Jean-Claude Van Dest, Ezanville, France, assignors to Massey-Ferguson S.A., Paris, France
Filed Oct. 24, 1965, Ser. No. 504,966
Claims priority, application Great Britain, Oct. 27, 1964, 43,714/64
10 Claims. (Cl. 280—405)

ABSTRACT OF THE DISCLOSURE

A frame pivotally supported on the conventional draft links of a tractor with a load transferring assembly comprising a link pivotally connecting the tractor lift arms with the frame which acts as a fulcrum and a flexible link between the frame and a pulled implement. A conventional drawbar carries the draft load while the subject hitch transmits both vertical and horizontal forces from the flexible link to the lift system of the tractor.

---

This invention relates to tractor hitches and more particularly to tractor hitches of the type that transfer weight from the hitched implement over vehicle to the tractor.

The three point hitch system for mounting implements on a tractor having a power lift arrangement for raising and lowering the implement with respect to the ground has been widely accepted. Such a system allows the use of a light tractor since a portion of the implement weight as well as soil suction forces is transferred to the tractor resulting in increased traction.

The use of large semi-mounted implements, pull type implements and wagons does not permit the use of the normal three point hitch. Various means have been proposed to transfer weight from a pulled implement to the tractor, however, most of these require special hitch attachments for the implement as well as the tractor, are expensive, bulky or must be removed to utilize the normal three point hitch.

Recently tractors have been introduced that employ pressure control in the hydraulic lift system. The pressure control allows a predetermined and constant weight transfer to the tractor through the lift system, since the system can be set to provide constant lift pressure, to transfer a portion of the weight of an implement to the tractor. An integral pressure control system allows the weight transfer to be independent of the changes in geometry between the implement and tractor during pitching and when operating said working tools at different depths.

It is, therefore, an object of the invention to provide a tractor hitch that can be used with pulled or semi-mounted implements and can effectively utilize the advantages of a pressure control system in the tractor hydraulic lift system.

A further object of the invention is the provision of a weight transfer hitch that can easily be attached to a tractor and pulled implement, and can remain attached to the tractor without interfering with three point hitch mounted implement operation.

Another object is to provide a tractor hitch for transferring weight from a pulled implement to the tractor that is easily attached to a variety of different implements and provides substantially the same load transfer characteristics for each of the implements.

A still further object is to provide a tractor hitch that can rapidly accommodate pitching between the tractor and implement and still maintain constant load transfer.

These and other objects and advantages will be readily apparent from the following description and accompanying drawings in which:

FIG. 1 is a diagrammatic side elevation of a tractor hitch shown mounted on tractor draft links;

FIG. 2 is a section on the line 2—2 of FIG. 1;

FIG. 3 is a view to a larger scale of the parts enclosed in the circle Y of FIG. 1; and FIG. 4 is a schematic side elevation of a tractor with one wheel removed and a semi-mounted implement coupled to the tractor with a hitch embodying the present invention.

Briefly the invention involves the use of a frame pivotally supported on the conventional draft links of a tractor with a load transferring assembly comprising a link pivotally connecting the conventional lift arms with the frame which acts as a fulcrum and a flexible link between the frame and the pulled implement. The draft load is carried by a conventional drawbar. The hitch is arranged to transmit both vertical and horizontal forces in the flexible link to the lift system. Rapid correction of forces is obtained by a compound rapid movement of the frame during operation of the lift system.

Referring now to the drawings, the tractor A is provided with a pair of draft links 10 pivotally connected at 12 to the tractor and connected through drop links 14 and lift arms 16 to the tractor power lift including ram 11, pump and control 15 and handle 15. An inverted U-shaped frame generaly indicated 18 includes laterally spaced upright legs 19 interconnected at their upper ends by a triangular connecting piece or rocker 20. The legs 19 are mounted on the draft links 10 intermediate their ends for pivotal movement about transverse substantially horizontal pivot pins 21.

The rocker 20 carries a horizontal fore-and-aft extending pivot pin 22 on which is mounted a connecting link 23. A transversely extending pivot pin 24 on the link 23 forms the attachment point of a bracket 25 rigidly affixed to first load carrying means in the form of a U-shaped secondary frame or load transfer link 30. The free ends of the frame 30 are connected to cranks 29 secured on the power lift arms 16. Rotation of cranks 29 provides a fore-and-aft component of movement to the top of the frame 30.

A load transmitting assembly 31 is mounted for horizontal swinging movement on a vertical pin 32 (FIG. 3) carried on the bracket 25, and extending rearwards from the assembly 31 is a second part of the load carrying support means in the form of a chain 33. In use the free end of the latter is attached to the tongue or drawbar of a semimounted implement as shown in FIG. 4. It is to be understood that where the term "implement" is used in this description and accompanying claims, it includes any ground supported vehicle, implement or tool such as a wagon, a plow, a planter, etc.

The invention is most useful when used in combination with a tractor fitted with an automatic pressure control system by virtue of which weight transfer to the tractor from a pulled implement or wagon is maintained constant. In such a tractor the pressure in the ram of the hydraulic system is maintained constant at a selected value. Changes in the load applied to the draft links result in a tendency to increase or decrease the pressure in the ram and such tendency is sensed by the system to maintain a constant pressure on the hydraulic lift ram or cylinder.

In operation with such a tractor, suppose the trailer has a forwardly extending drawbar by means of which it is connected to the tractor at a point below and intermediate the draft links. The chain 33 is attached by any suitable means at its free end to the implement or the implement drawbar. The tractor ram 11 connected to crank 16 is raised until the desired proportion of the implement weight is transferred to the tractor. This weight or force is transferred through the chain 33 to the bracket 25. At this point the load splits, the vertical component of the weight acting through the frame 18 to the links 10, the links 14 and lift arms 16 and the horizontal component of the weight acting through the frame 30 to the arms 29 secured to the arms 16. The weight or load is carried by the arms 16 to the cross shaft which is connected to the hydraulic ram 11.

If, now the implement rises relative to the rear of the tractor, as where the tractor starts up an incline, the load on the chain lessens and the pressure in the ram falls. The pressure control system then causes a pressure increase signal so that force on the lift arms 16 tends to both raise the draft links and pull back on member 30 and take up the slack in the chain. Thus, as the lift arms 16 rotate, the cranks 29 rotate with them moving the secondary frame 30 forward to pull the main frame 18 forward about the pivot pins 21. Thus, as the draft links raise the main frame 18, it also pivots forward, so that the load on the chain is quickly restored. Due to this combined forward and upward movement, any slack that might have developed, is quickly taken up and the hitch adjusts itself very rapidly to relative pitching movement between the tractor and implement.

As mentioned above, connecting the secondary frame 30 to the cranks 29, the frame 30 acts on the lift arms 16 in a generally horizontal direction. This assists in maintaining the weight transfer substantially constant for a given ram pressure regardless of the angle of the chain 33. If the frame 30 pulled upwardly or downwardly on the lift arms 16 as the chain angle varied, unnecessary fluctuations in weight transfer would arise.

The main frame 18 maintains the chain 33 at a desired height above the implement drawbar. This maintains the structure well clear of the normal tractor PTO shaft when the pulled implement is PTO driven and the hitch can thus be used to transfer weight from PTO driven implements.

Due to the shape of the main frame 18, the space between and above the draft links is left clear so that three point mounted implements may be attached to the tractor removing the weight transfer hitch from the tractor.

Furthermore, the upright members 19 are pivotally connected to the rocker 20 as seen in FIG. 2, and hence the normal leveling box 34 connected in one or both of the drop links 14 may be used to adjust the height of the draft links relative to one another.

It is possible for the drawbar pin to break or for the operator, when uncoupling the trailer, to remove only the drawbar pin but leave the chain attached to the trailer. Under these conditions all of the forces between the tractor and the trailer including the draft forces must pass through the chain 33. This means that these forces will be applied to the tractor at a relatively high point thus causing a danger of overturning the tractor. The assembly 31 is constructed to avoid this danger by disconnecting the chain from the hitch in such circumstances and thus releasing the load. An example of a suitable automatic load release for this purpose is described in our co-pending application No. 504,947, entitled Angularly Responsive Load Release filed October 24, 1965.

The main frame member 18 may be in any suitable form such as a strut connected between the draft links, with a cable or chain running from the lift arms to the trailer over the strut. The strut may carry a rotatable pulley for the cable or chain if desired. Alternatively, instead of the cable or chain extending the entire way between the lift arms and the trailer, the section between the lift arms and the strut may be replaced by a rigid link pivotally connected at one end to at least one lift arm and at the other end to the strut. Moreover, the cable, chain or rigid link may be connected to a crank carried by the lift arms instead of to the lift arms themselves or to any memebr movable fore-and-aft in response to movement of the power lift.

One additional advantage of the invention arises in the event that the implement drawbar is not sufficiently strong to withstand the lifting forces involved, the chain must be connected to a point further to the rear of the trailer. With a hitch made according to the invention, weight transfer to the tractor can still be achieved since the weight transfer is not critically dependent on the angle of inclination of the chain 33.

We claim:
1. A weight transfer hitch for a tractor having a power lift system including a pair of draft links connected to hydraulically actuated lift arms, said hitch including a vertically extending support frame pivotally carried by said links for fore-and-aft movement about a horizontal transverse axis, first load support means connecting the upper portion of said support member with said lift arms to provide for fore-and-aft movement of said upper portion as said lift arms are actuated to raise and lower said draft links, said support member being raised and lowered with said draft links, second load support means connected to said upper portion and adapted to be connected to an implement drawn by the tractor.

2. The hitch of claim 1 wherein said support frame is an inverted U-shaped member having its legs pivoted to said draft links.

3. The hitch of claim 2 wherein the base of said U comprises a transverse link pivotally connected to the legs of said U, said first load supporting means forming a rigid link pivotally connected to said transverse axis as well as a fore-and-aft horizontal axis.

4. The hitch of claim 1 wherein said first load supportng member is in the form of a rigid link pivoted at one end to said support frame and pivoted at its other end to said lift arms.

5 The hitch of claim 4 wherein said first load supporting member is further in the form of a U-shaped member having the free ends of the legs pivoted to said lift arms.

6. The hitch of claim 1 wherein said second support means is an extensible flexible member.

7. A tractor-implement combination including a tractor having a pair of laterally spaced draft links connected for up and down movement by a pair of lift arms actuable by a controlled pressure power lift system, an implement having a draft tongue connected to the tractor for pulling the implement, a hitch for transferring weight from the pulled implement to the tractor including a vertical support frame pivotally mounted at its lower end to said draft links and movable up and down with said links, a first load support member connected to said lift arms and the upper portion of said support frame so as to cause fore-and-aft movement of said support frame as said lift arms are operated to raise and lower said draft links, an inextensible flexible load support member connected at one end to the upper portion of said support frame and at the other end to said implement, said hitch serving to transfer weight from said implement to said tractor in accordance with the pressure in said lift system.

8. The tractor-implement combination of claim 7 when said support frame is in the form of an inverted U-shaped member having the free ends of the legs of the U pivotally connected to said draft links and the base of the U forming a transverse link pivotally connecting said first load support member and said flexible member.

9. The tractor-implement combination of claim 7 wherein said first load support member is in the form of a U having the free ends of its legs pivotally connected to said pair of lift arms for fore-and-aft movement, and its base pivotally connected for movement about a transverse horizontal axis to said supoprt frame.

10. The tractor-implement combination of claim 8 wherein means are provided for automatic release of said weight transfer hitch.

References Cited

UNITED STATES PATENTS

| | | | |
|---|---|---|---|
| 3,062,561 | 11/1962 | Wulff et al. | 280—405 |
| 3,173,496 | 3/1965 | Annat | 172—7 X |
| 3,198,547 | 8/1965 | Annat | 280—405 |
| 3,214,189 | 10/1965 | Annat | 280—405 |

LEO FRIAGLIA, *Primary Examiner.*